United States Patent [19]

Massie et al.

[11] 4,188,122

[45] Feb. 12, 1980

[54] INTERFEROMETER

[75] Inventors: Norbert A. Massie, Thousand Oaks; Sandor Holly, Woodland Hills, both of Calif.

[73] Assignee: Rockwell International Corporation, El Segundo, Calif.

[21] Appl. No.: 890,096

[22] Filed: Mar. 27, 1978

[51] Int. Cl.² ............................................. G01B 9/02
[52] U.S. Cl. .................................. 356/349; 356/351; 356/360
[58] Field of Search ........................ 356/349, 351, 360

[56] References Cited

U.S. PATENT DOCUMENTS

| | | | |
|---|---|---|---|
| 3,463,924 | 8/1969 | Culshaw et al. | 356/349 X |
| 3,877,813 | 4/1975 | Hayes et al. | 356/349 |

OTHER PUBLICATIONS

Lavan et al., "Optical Heterodyne Interferometer with Radio-frequency Phase Reference", *Applied Optics*, vol. 15, No. 11, pp. 2627-2628, 11/76.

*Primary Examiner*—Vincent P. McGraw
*Assistant Examiner*—Matthew W. Koren
*Attorney, Agent, or Firm*—L. Lee Humphries; Robert M. Sperry

[57] ABSTRACT

A laser beam is split into two components which remain coherent, are differently frequency-shifted, orthogonally polarized and recombined. The recombined beam is expanded and directed into polarization type beam splitter directing one component into a reference branch, the other one into a test branch. Both branches return the component beams which are combined and polarization filtered so that they may interfere on account of local optical path differences. Brightness oscillations are photoelectrically detected in individual points of a plane intercepting the interference beam and referenced as to phase against a reference oscillation derived from a particular point in that plane. The phase differences are electronically acquired point-by-point for generation of a contour map or its equivalent of the optical path differences as between a test object in the test branch and a reference object in the reference branch.

16 Claims, 8 Drawing Figures

INTERFEROMETER

BACKGROUND OF THE INVENTION

The present invention relates to interferometers of the type to be used for detecting surface deformations and medium inhomogeneities.

The art of interferometers is fairly well established. The "textbook" variety of interferometers goes back, basically, to Michelson and consists of a light beam, a beam splitter directing components of the beam towards two mirrors and recombining the two reflected beams to obtain an interference pattern which can be used for a variety of purposes including the detection of flaws in one mirror while using the other one as a reference. The two beams have propagated along different paths, and any resulting interference pattern is attributable to optical path differences. The resolution of detecting surface deformations in this manner is inherently limited by the wave length of the radiation used, one does not obtain a finer contour pattern than permitted by the resulting fringes whose spacing is directly related to the wave length. The spacing of two fringes represents an elevational difference equal to one-half wave length. The present invention relates to an interferometer which still employs the basic principle of beam splitting, separate reflection on test and reference mirrors, and recombining the two reflected components for purposes of interference. However, the invention is directed towards an attempt to obtain a higher resolution; i.e. to overcome the apparently inherent limitation of a one half wave length resolution of the known methods.

Other types of interferometers are known such as the Fizeau interferometer, or the Twymann Green interferometer which really is an outgrowth of the Michelson device. Fairly recently, one of us took a still different approach using beams intersecting in an interference zone in which the test object (mirror) has been placed and back scatter is observed (U.S. Pat. No. 4,030,830) for purposes of detecting local surface defects. The same principle of intersecting interfering beams is also used in other applicatons (see "Optical Engineering", Vol. 15, No. 2, page 146; Lateral Interferometry, Its characteristics, Technology And Applications). The present invention does not follow that approach.

It should be mentioned that there is a significant need for a high resolution interferometer for detecting small deviations from ideal surface shapes in mirrors which are to be used in demanding applications of modern optics. Optical devices which are limited to a one-half wave length resolution are inadequate for that purpose. Moreover, the known interferometer of the Michelson family are susceptible to errors on account of vibrations of and in the equipment. Further, it is desirable to obtain the desired information about surface deformations or medium homogeneities in a manner permitting direct and immediate acquisition of optical, interferometer information by electronic equipment to further permit the direct presentation of such information as digital signals.

DESCRIPTION OF THE INVENTION

It is an object of the present invention to provide a new and improved interferometric method and system for obtaining a representation of the surface contour of a mirror or a description of medium homogeneity with a resolution which is higher than given by the wavelength of the radiation employed in the method and system. The method and system should also be highly insensitive to physical motion of the mirror and/or of the equipment during the measurement. The method and system is expected to be amenable to a high degree of automation without requiring high skills in optics.

In accordance with the preferred embodiment of the present invention, it is suggested to produce a monochromatic beam and separating the beam into two components. These two components are frequency shifted, but by different amounts, and they are also orthogonally polarized. The two components are recombined to establish a test or inspection beam which includes the still two coherent components traveling together but (a) differing in frequency, the difference being many orders of magnitude smaller than the frequency of either components, and (b) having different polarizations for purposes of identification; this will be called "tagging" in the following. This test beam is passed into a beam splitter designed to separate the two tagged components an directing them towards two mirrors, one being a reference mirror, the other one being either a mirror to be tested or a mirror disposed behind a medium to be inspected as to homogeneity. The reflected beams are recombined and the resulting combination beam is polarization-processed to now obtain components of the same polarizations so that the components are permitted to interfere. Interference fringes can be observed either visually or electronically in a plane intersecting the latter composite beam in which fringes move in directions perpendicularly to their extensions at a rate equal to the difference in frequency of the two beams. Consequently, the light intensity oscillates in any point in that detection plane and at that frequency but at a phase that can be directly related to the optical path difference for that point. The oscillations are detected in each of the points in the detection plane and compared with a reference oscillation. The phase so detected is directly proportional to the optical path difference as between the test arm and the reference arm of the interferometer, the optical path difference being either the result of a test surface deformation (as compared with the surface of the reference mirror) or the result of a local inhomogeneity of the test medium. The resolution of the detection of optical path differences is determined by the resolution of detecting different phase differences for different detection points in the detector plane. Detection of the phase information in as many points in the detection plane as practicable permits the generation of a contour map whose resolution is no longer limited by the optical wave length involved, but is limited only by the resolution of the point-by-point detection process.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 2c is a signal diagram relevant to FIG. 2a;

FIG. 4 is a representative example of a contour diagram that has been obtained with the system shown in FIG. 1.

Figure 1:
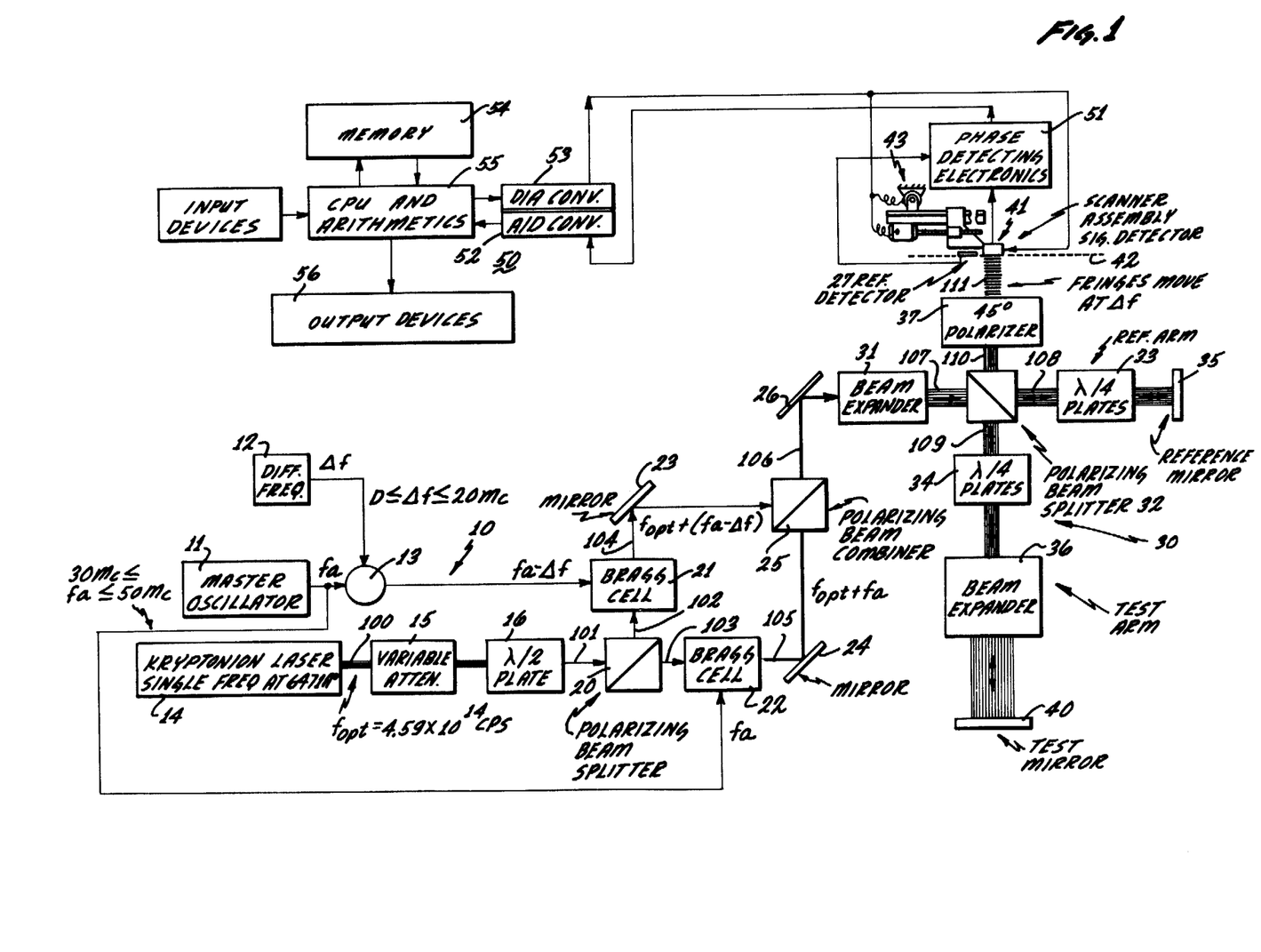
FIG. 1 is a block diagram of a system in accordance with the preferred embodiment for testing the figure of a mirror.

Proceeding now to the detailed description of the drawings, the block diagram of FIG. 1 includes an electronic-optical preparatory section 10 for producing a composite test beam having two components which differ in frequency and polarization, an interferometric measuring section 30 and an electronic acquisition and evaluation section 50. The purpose of this assembly is to ascertain the surface contour of a mirror 40 and to detect any surface defects, unevennesses, etc. Mirror 40, in effect, becomes temporarily incorporated in section 30.

Beginning with section 10, it includes a master oscillator 11 producing a constant frequency signal of a frequency $f_a$. This frequency may fall within a range typically from 30MC to 50MC; and typically $f_a$ may be 40 MHz. As will be apparent below, this frequency is produced merely as an auxiliary operating parameter and does not become directly an operating parameter of the interferometric measurement.

A second oscillator 12 is provided to produce a frequency which for reasons of convenience may be called a difference frequency $\Delta f$. This frequency may fall within the range from 0 to 20MC; typically $\Delta f$ will be 0.1 MHz. It may be advisable in cases to render the frequency of oscillator 12 adjustable, permitting adjustment to very low values if visual inspection of fringe patterns is desired, otherwise $\Delta f$ should be in a range in which available equipment can be used for purposes of phase detection. This frequency $\Delta f$ is a significant operating parameter and is characterized by the fact that the value is low as compared with the other operating frequencies in the system. A summing network 13 plus filter receives the two outputs of oscillators 11 and 12 and produces the frequency $f_a \pm \Delta f$, one of which will be suppressed.

The basic optical input for the interferometric system is provided by a highly monochromatic source of electromagnetic radiation, i.e. a single frequency laser. Conveniently, this source may be a krypton ion laser 14 issuing a beam 100 of a single frequency $f_{opt} = 4.59 \times 10^8$ MHz at a wave length of 6471 Å. A variable attenuator 15 establishes an output level the amplitude of which may be varied.

The optical output of the laser/attenuator assembly is linearly polarized but in an arbitrary plane. A $\lambda/2$ plate 16 is provided to adjust the plane of a linear polarization to a suitable orientation. Presently, it may be assumed that the plane of polarization is adjusted to extend at a 45° angle to the plane of the drawing.

The radiation beam 101 as leaving the plate 16 is now received by a polarizing beam splitter 20. The function of the splitter 20 can be taken from its designation. First of all, it splits the incoming beam into two components 102 and 103, preferably of equal magnitude by extracting differently polarized components from the beam 101 and directing them into different directions. The orientation of plate 16 as defining the orientation of the polarization plane of beam 101 is instrumental in obtaining the amplitude equality. Since the beam splitting is carried out on the basis of polarization, the two beams 102 and 103 are now tagged by specific polarization. For example, beam 102 may be polarized transversely to the plane of the drawing and beam 103 will then be polarized parallel to the plane of the drawing. Both beams, however, remain coherent.

Beam 102 is received by a Bragg cell 21 and beam 102 is received by a Bragg cell 22. The Bragg cells are optically transmissive devices which upon being electrically stimulated propagate acoustic waves in a direction transversely to the direction of the beam propagation. These waves change the optical density in the Bragg cell medium and in such a manner that in additon to passing an unmodified portion of the beam each Bragg cell diffracts some of the radiation. The relative percentage of the diffracted intensity is proportional to the acoustic excitation of the Bragg cell. The diffracted beam emerges at an acute angle to the principal direction of propagation and has its frequency up or down shifted. Only one of the latter two beams is being used as an output of each of the cells. Thus, a frequency shifted beam leaves each of the Bragg cells at the so-called Bragg angle, the two beams being denoted 104 and 105, respectively. Accordingly, beam 104 is a beam of light being polarized transversely to the plane of the drawings and having a frequency, for example. of $f_{opt} + (f_a - \Delta f)$; beam 105 is a beam of light being polarized in the plane of the drawings and having frequency of $f_{opt} + f_a$. Again, one could use the difference-of-the frequencies (e.g. $f_{opt} - f_a$) which is an arbitrary choice, but the choice must be the same for both of the two cells.

A pair of mirrors 23 and 24, respectively, redirects the two beams 104, 105 into a polarizing beam combiner which, by virtue of the specific polarization causes beam 104 to be reflected by 90° while permitting beam 105 to pass so that a combination beam 106 leaves splitter 25. The two beams are still coherent though having slightly different frequencies, the difference being equal to $\Delta f$; however, the two beams are now distinctly identified and they do not interfere on account of their different, orthogonally oriented polarizations. This beam 106 is the output beam of the section 10.

A mirror 26 directs the beam 106 into the interferometer measuring section 30. The input of that section, therefore, is a beam having the properties as listed above. Since the beams as considered thus far have a transverse width which is basically established by the rather narrow output beam waist of laser 14, an expansion of the beam is required. One could widen the beam at this point to the dimension of the mirror 40 to be tested; however, the optical equipment still needed for processing the beam before undertaking the measurement would become needlessly wide and very expensive. A widening of the beam at this point is, therefore, needed only commensurate with the required spatial resolution of the detection, as will be described below. Accordingly, a first beam expander 31 is provided in the path of beam 106, providing a wider beam 107 still being of the composite nature as aforedescribed. Beam 107 may, for example, be widened to about 1" diameter.

The principal element of the interferometer is a third polarizing beam splitter 32 which separates again the two expanded beams into component beams 108 and 109 of different frequency and polarizations. Beam 108 is directed into the reference arm or branch of the device, passes a so-called quarter wave plate 33 to become circularly polarized and is intercepted by a reference mirror 35 having a surface figure of very high optical quality. The beam is reflected, returns on its incoming path and again is linearly polarized, but now the polarization vector is 90° rotated with respect to the initial polarization so that the return beam of 108 is reflected by the beam splitter 32 towards its forth port and becomes one component of an output beam 110.

The beam 109 is the test beam proper and passes likewise a λ/4 plate 34 to become circularly polarized. A second beam expander 36 expands the beam 109 laterally to the dimensions of the mirror 40 to be tested, or at least to the dimensions of the area of the mirror to be tested in one test run; for example, up to 4" or 6". The expanded beam is reflected into itself and the reflected wave fronts (of equal phase) are spatially modulated in the direction of propagation and in accordance with the surface contour of the mirror 40 whereby this phase shift, in space, is twice the depth variations of the mirror on account of the fact that any increment of the test beam traverses any path increment twice.

The return beam of 109 is contracted by device 36, and is linearly polarized by plate 34; the final polarization is perpendicular to the original one of that beam. Thus, the return beam of 109 passes the splitter 32 straight through and becomes the second component of composite beam 110. This beam 110 is now composed of a first component having (a) the frequency $f_{opt}+f_a$; (b) a polarization transversely to the plane of the drawing, and (c) planar wave fronts commensurate with the planarity of reference mirror 35. The second component of beam 110 has (a) a frequency of $f_{opt}+f_a-\Delta f$; (b) a polarization parallel to the plane of the drawing, and (c) a wave front that is spatially modulated by the surface irregularities (if any) of mirror 40.

This composite beam 110 after leaving the exit port of splitter 32, is passed through a linear polarizer 37 oriented at 45° to both of the existing polarizations. This polarization filter 37 extracts from each beam component a particular component of identical polarization. The resulting two beams are, therefore, permitted to interfere, resulting in a beam which can be called an interference beam. An interference pattern can be picked up in any plane intercepting the beam path, such as the plane 42. Since the interfering waves do not have the same frequency, the interference pattern can be described by the equation $S=S_o \cos 2\pi[\phi(x,y)+\Delta ft]$. The function $\phi(x,y)$ in this equation has the following meaning. Take any point x,y in the detection plane, and project it back through the optical equipment to mirror 40 and also to mirror 35. $\phi(x,y)$ for that point represents the difference in the length of these two optical paths. If both mirrors are truly plane (or have the same curved contour)=const. If 35 only is plane, the function $\phi$ represents (twice) the surface contour of mirror 40 in units of wave lengths; $S_o$ is constant if the beams have constant intensity across the width. The interference pattern, therefore, is a time variable one, with a phase which directly represents the contour or figure of the test mirror, or a deviation of that mirror from the contour or figure of reference mirror 35.

A signal detector 41 is disposed in plane 42. The detector has a rather small aperture and can be moved in the detection plane 42, for example, by means of a motor driven cross slide arrangement 43 or the like which establishes individual scanning positions in accordance with an array of raster points in plane 42 for purposes of detection.

Figure 2:
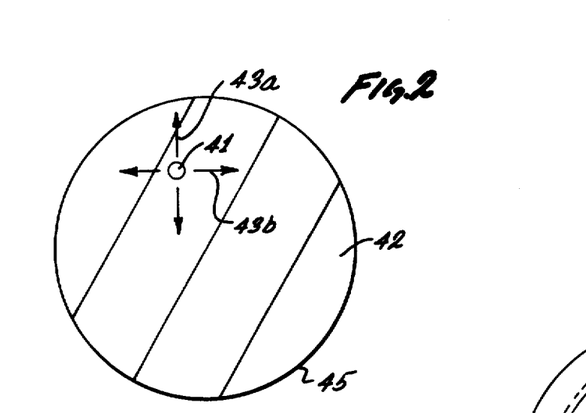
FIGS. 2, 2a, 2b, are plots of fringe patterns as they may appear in the system of FIG. 1.

FIG. 2 is a representative example of a fringe pattern as it could be taken from plane 42 and as it could be seen; for example, if a simple reflective medium were placed in that plane. Such an image could also be seen by an observer when looking from the back at a translucent plate, e.g. a frosted glass plate when placed in that plane 42. Normally, such direct image producing device is not present in plane 42, rather the detector 41 looks at a very limited portion of the radiation in the traversing plane 42 but covers stepwise an inspection field such as delineated by circle 45 in FIG. 2. Arrows 43a and 43b depict the displacement the detector 41 undergoes in the plane 42 (being the plane of the drawing of FIG. 2) when moved by the cross slide 43. Details of the detection process in field 45 will be discussed below, but it will be appreciated that by stepping the position of detector 41 systematically through field 45, one obtains a raster covering the fringe patterns.

The output signal of the detector 41 fed to a phase detector 51 as one input thereof. The second input for the phase detector is derived from a detector 27 which has a fixed position in the detection plane 42, preferably near the border of the inspection field, simply to avoid interfering with the scanning operation of the mechanically moved detector 41. As will be explained in detail below, the outputs of detectors 27 and 41 are r-f signals with an oscillation frequency $\Delta f$, but these signals may differ in phase. Thus, the output of circuit 51 is a d.c. signal which represents the phase between the reference signal and the detector signal.

The output of electronics 51 is fed to a digitizer 52 feeding digital data to the CPU 55 of section 50 which constitutes a computing and ditial data processing facility. The CPU 55 cooperates with a memory 54 to obtain stepwise acquisition and storage of the plane data and to execute the acquisition program. This acquisition program includes the stepping of cross slide 43 through the raster points in the detection plane and the area delineated by 45. Accordinly, the facility 50 may issue drive signals via a digital-to-analog converter 53 for operating the cross slide drives which position and reposition the cross slide 43 and the detector 41 thereon. The control may be somewhat more complex and may include feedback and accurate position measuring devices, etc. However, such devices are well known and do not require elaboration. Generally speaking, devices to position an object very accurately (e.g. detection and pick up device) are known and can be used in this environment.

Figure 2A:
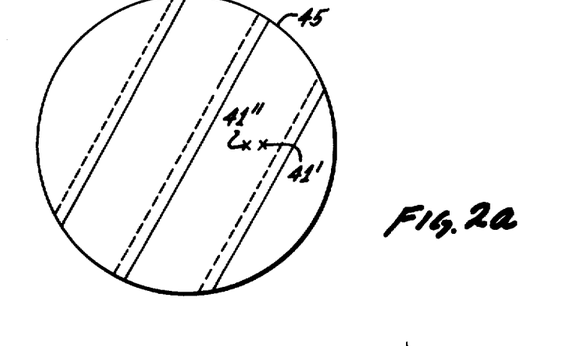
Figure 2B:
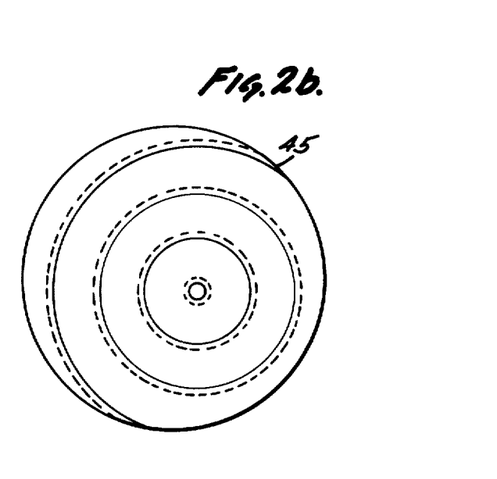
Figures 2C, 4:
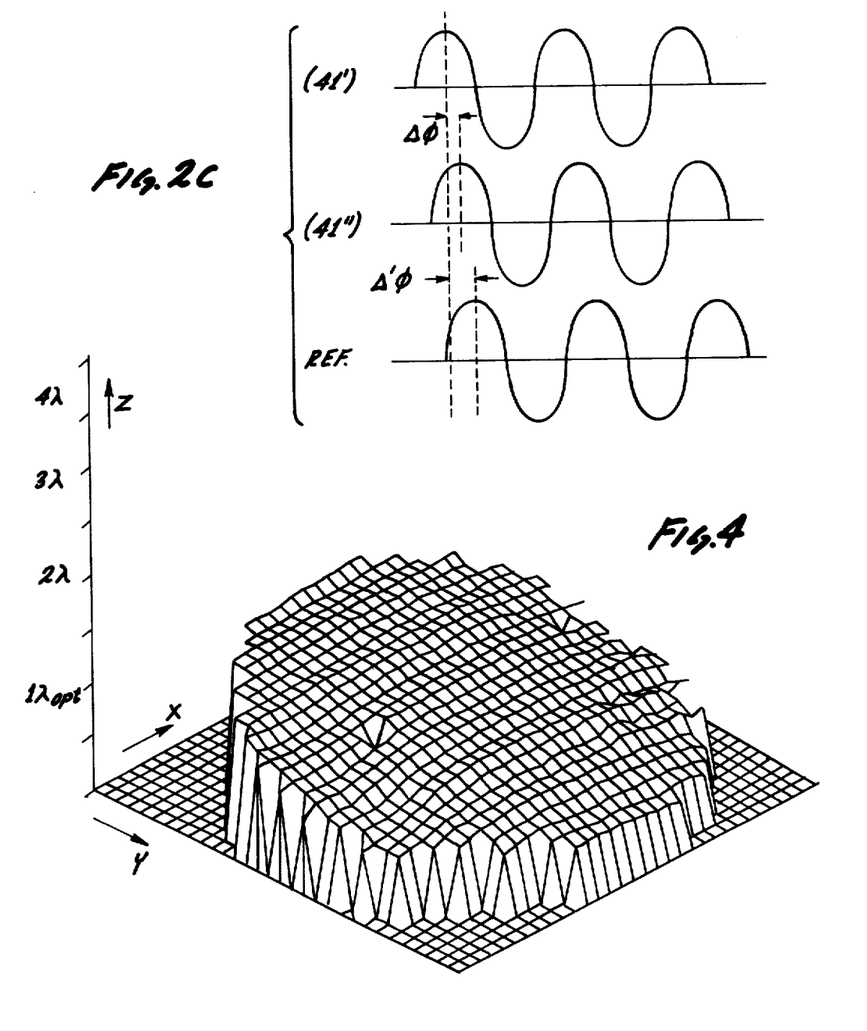

In addition, the facility 50 correlates the coordinates of the raster points as established by the cross slide and detector 41, but being software assigned as position data, with the phase data subsequently acquired and taken from the phase detector 51. The facility 50 may convert these phase data into elevation points in an x, y, z coordinate system. These data may be printed out and/or plotted in a manner known per se in computer technology which does not require elaboration. Reference numeral 56 refers to suitable output devices. FIG. 4 is a representative example of such a contour map which has been plotted from data actually ascertained with the inventive system.

It should be mentioned that automation of the operation is convenient and practical, and the interferometer of the invention is particularly designed to permit such automation. However, the data can be acquired manually, for example, by moving the detector 41 into the different position through operation of high precision adjustment spindles, and reading the phase difference from an instrument connected to the output of circuit 51.

After having described the system, the following summary may be in order. The section 10 produces a composite beam (106) in which two beams of slightly differing frequencies (the difference being $\Delta f$) and of orthogonally oriented linear polarizations are combined in the same optical path. Section 10, therefore, has the function of generating two highly monochromatic, tagged beams of slightly different frequencies. The frequency $f_a$ plays an auxiliary part only in that Bragg cells are not commercially available at the desired rather low frequency $\Delta f$, so that the laser beam frequency cannot be directly shifted in frequency in that manner. The frequency $f_a$, therefore, is provided only for placing the frequency shift into a range that can be handled by Bragg cells, and, as outlined above, the desired frequency difference comes about by using two Bragg cells operating at different frequencies, the difference being $\Delta f$. The main purpose of using frequencies $\Delta f$ which are one or two orders or magnitude lower than the frequencies at which conventional Bragg cells operate, is to simplify the phase sensing electronic circuits. Therefore, $\Delta f$ should be below about 5Mc for practical reasons of signal processing and phase detection. A second purpose would be to permit setting $\Delta f$ to low values including approximately zero for purposes of visual observation. As stated, 100 KHz is a very convenient frequency for most applications, particularly the automated acquisition of data.

The section 30 generates an interference pattern by means of which one can determine the planarity of the mirror 40 in a manner to be described more fully below. The interference pattern appears in plane 42 which is orthogonal to the direction of propagation of composite beam 110. The pattern can be described by the function $S = S_0 \times \cos 2\pi[\phi(x,y) + \Delta ft]$, wherein the phase $\phi$ is directly related to and describes the surface contour of mirror 40. The coordinates x and y are coordinates in the plane of mirror 40 and/or in the plane 42. The transformation in coordinates is given by the beam expander 36. Since the function above is time variable, the interference pattern is, in fact, a moving one in which fringe lines propagate orthogonally to their extensions in plane 42. The detection process covering the inspection area (45) and the plane 42 where intersecting beam 111 will produce a very fine resolution elevation pattern representing the surface contour of mirror 40.

Section 50 actually processes the detection data to obtain such a contour map. The input of section 50 references the function S against a function whch could be described a $R = R_0 \times \cos(2\pi\Delta ft)$. This function R is the reference signal produced by detector 27 and is used to eliminate the time variation for purposes of directly finding $\phi = \phi(x,y)$, being a phase distribution function from which one may draw directly a contour map such as shown in FIG. 4. To say it differently, the detectors 41, 27 together establish time varying functions which together describe the interference pattern and which include the spatial distribution of the contour of the test mirror as phase information. The phase detection extracts that phase information, separately for each raster point and permits, in turn, the generation of a contour map.

The polarization type beam splitting arrangement 32, 33 and 34 is used for efficiently splitting the beam into the two polarized components. In principle, one could use a regular beam splitter with polarization filters placed in each arm. However, on each passage, one would lose 50% beam intensity (or a total of 75%) and the resolution would suffer.

Other modifications which are conceivable relate to the scanning and detection device 41/43. Instead of the electromechanical type scanning and physical movement of the detector, one could use electronic imaging equipment with electron beam type scanning or one could use a detector array composed of semi-conductor elements which are being scanned and interrogated individually. In this instance, one of the cells in the array will serve permanently as reference signal detector.

In all these instances, however, the scanning process should be under control of the computer 50 because it is absolutely essential to correlate raster point identification with acquired phase data. However, the scanning unit may be autonomous and may furnish the position data to the acquisition electronics 50.

In order to more fully understand the detection process, several different situations will be discussed. Assuming in the first instance, (a) that $\Delta f = 0$, both beam components (104, 105 or 108, 109) having equal frequency and (b) that test mirror 40 is indeed absolutely plane, i.e. has no defect. Under such conditions both components in beam 110 are everywhere in phase or have a constant phase difference in the plane 42 or in any plane parallel thereto; they interfere and produce a uniform brightness in the detection field of plane 42. If one would shift one or the other of the mirrors 35, 40 in the respective direction of the beam paths the brightness changes in the detector field. Upon shifting one or the other of the mirrors from a position in which the resulting brightness is very low, and over a distance equal to $\lambda_{opt}/2$ the overall brightness would change through a full cycle, e.g. from dark to maximum brightness and back to dark.

The second instance assumes either a very large unevenness or a slight tilt of mirror 40 which is the equivalent of a large, uniform unevenness of the mirror. In this case now, plural parallel interference fringes in the form of straight lines will appear in the detection plane 42. The line pattern will exhibit a line spacing which is inversely proportionate to the inclination or the assumed large unevenness of the mirror 40; the line spacing is also linearly proportionate to the wave length. We still assume $\Delta f$ to be zero, and the fringe line pattern is stationary. These interference fringe lines, their contour and their spacing represent the mirror surface. FIG. 2 can be interpreted as an example for this case. It should be pointed out, however, that for purposes of the step-by-step explanation, we ignore the detection process presently.

If now the unevenness is an irregular one (assumed case 3), these fringe lines delineate the contours of the unevennness as contour lines and the spacing of the lines represents the steepness. The solid lines in FIG. 2b represent that case. The contour line resolution of detecting optical path differences is one-half of the chosen optical wave length. To produce this result ($\Delta f = 0$) one actually does not need the different polarizations as the device would, in fact, operate just as a regular, conventional interferometer.

Case 4 assumes that the test mirror 40 is planar, i.e. highly flat, and not tilted, but $\Delta f \neq 0$, the overall brightness will fluctuate spatially, uniformly over the entire detection zone and at the frequency $\Delta f$.

Next, case 5, we turn to an instance of a slightly tilted planar (or uniformly uneven) test mirror 40. In the case 2 above, a fringe line pattern appeared that was stationary for $\Delta f=0$. As a consequence, the line pattern will run everywhere in a direction extending transversely to the extension of the lines and at a rate that is equal to $\Delta f$.

Consider the following. A plane exactly at right angles to beam 109 may be regarded as horizontal as far as the mirror is concerned and a direction toward the mirror may be "down" and the opposite direction could be termed "up". A tilt of mirror 40 will, therefore, have one edge 37 up" and one edge "down". The frequencies may have been chosen so that the fringe lines will, in fact, run "down hill". Now we turn to other types of defects. Take the case of a depression, i.e. dent in the mirror surface, the contour lines will be more or less concentric around the deepest point of the dent and all lines moving towards that bottom of the depression will appear to vanish therein. In the case of a bulge or buckle in the mirror surface, the contour lines will "appear" at the peak and run "down hill" in all directions as ever widening closed lines.

Thus, the running of the fringe lines represents in sequential instants different sets of contour-fringe lines to represent the unevenness of the mirror 40. The pattern is the same for instants being apart by one full (or integral multiples of one) oscillation period of frequency $\Delta f$. To state it differently, a set of fringe lines will be present in plane 42 in any instant and the lines are spaced apart from each other commensurate with a total (round trip) optical path difference equal to $\lambda_{opt}$ from line to line. An instant being later by, say 1/10 of an oscillation period at the $\Delta f$ frequency, the contour line pattern has shifted in that each line has, so to speak, migrated down to a level $\lambda_{opt}/10$ below the respective previous levels. 1/10 (or 1/100 or 1/1000) of a period $\Delta f$ later the lines have shifted again down by $\lambda_{opt}/10$ ($\lambda_{opt}/100$ or $\lambda_{opt}/1000$). FIGS. 2a and 2b represent such cases. The solid drawn lines are assumed fringe lines of minimum brightness (at enhanced contrast) representing the interference pattern in a given instant. The dashed lines represent the same fringe line pattern but about 1/10 of the $\Delta f$ oscillation period later.

Each pattern represents a contour map of the mirror at a $\lambda_{opt}$ elevational resolution, but many such patterns together, i.e. a (hypothetical) set of lines drawn at sequential instants, but now taken together, represent the contour of the mirror's unevenness at a much higher resolution. Thus, if one were to take a plurality of snapshots, say 10 or 100 per oscillation cycle of $\Delta f$, one could obtain ten or one hundred different fringe line patterns which upon being superimposed, would be a contour map representing the mirror's unevenness at a ten or hundredfold increased resolution. Hypothetically, one could produce an output in this manner, but the scanning process of the equipment as described, is more elegant and of better immediate usefulness, though being basically electrically equivalent of the foregoing "superimposed multiple snapshot" method.

It can readily be seen that the light intensity in any one particular point in the detection plane 42 will oscillate at the $\Delta f$ frequency as the fringe pattern passes across (FIG. 2c). Such a point (.e.g. 41') represent a particular point on mirror 40, and the phase of that oscillation as detected in relation to the phase of similar oscillation in a neighboring point (e.g. 41" in FIG. 2a) represents the relative elevation or depression of these two points in relation to each other, their "altitude" difference. The upper and middle lines in FIG. 2c represent these oscillations, and the phase difference $\Delta\phi$ is directly proportional to the elevational difference of the two points 41', 41" as projected back onto mirror 40. However, rather than relating the phases of the oscillations in any point in field 45 to the phase of a neighboring point, it is more practical to detect the phase of oscillation in any of the points in inspection area or field 45 in relation to a reference which can be used for any and all such points in the detection plane. This is the function of phase detector 51 as receiving a reference signal from the detector 27.

It will be recalled that detector 27 extracts the $\Delta f$ frequency at a particular phase from beam 106, and circuit 51 determines the phase (as a d.c. voltage signal) between that reference and the particular oscillation monitored by detector 41 in any instant and for any particular point in the detection field 45. The lower line of FIG. 2c represents the reference oscillation and $\Delta'\phi$ is a phase difference that is representative of the local contour of the mirror 40 relative to the point on the mirror which is the projection of the location of the reference detector 27.

The accuracy of these detection proceedings are, of course, dependent upon the dimensions of the input aperture of detector 41 which will not sense any intensity oscillations in a point but necessarily over a finite area. Thus, strictly speaking, it was not quite accurate to speak of raster points, rather one should speak of an areal raster element, though the center of that area could be deemed to define a raster point. The larger the raster area, the less pronounced will be the oscillations that can be detected, and an aperture about equal to any spacing of the fringe lines will not perceive any brightness oscillations. Thus, the detector aperture should be samll as compared with the fringe line spacing (see FIG. 2). It should be noted, however, that the raster points (defined e.g. as the center of the detector aperture) may well be spaced from each other at a distance less than the detector aperture width, i.e. incremental areas under inspection by detector 41 as far as sequential inspections are concerned may overlap. Each such raster point yields a particular phase as to the detected oscillation at the $\Delta f$ frequency, and the phase value is directly indicative of a relative elevational value of the mirror at that spatial point of the raster scan. The phase values together define the mirror figure at a spatial resolution that is given by the raster point spacing; the resolution is not dependent upon the auxiliary modulation frequency $f_a$ and is only insignificantly dependent upon the frequency $\Delta f$ and the value for $\lambda_{opt}$.

The phase values as so established are not unambiguous but require modification and augmentation. The elevational pattern as established on the pass of such multiple raster points can be deemed divided by hypothetical lines of phase angle zero. The placement and overlay of these lines is quite arbitrary per se, but depends directly on the phase of the output of detector 27. Thus, the location of detector 27 and the phase line through that point represents the zero altitude level. Other such hypothetical phase zero lines will represent contour lines at an altitude of $+\lambda_{opt}$, $+2\lambda_{opt}$, $+\lambda_{opt}$, $-\lambda_{opt}$, etc. The phase values detected in raster points between such "lines" represent corresponding intermediate elevations at a resolution depending, as stated, on the raster. Generally speaking, the detector 41 will be stepped from raster point to raster point, and the phase of the oscillations will be ascertained point by point. A separate directional counter in processing facility 50 should keep track of the phase-zero crossings and should count the even multiples of such crossings as altitude and level units of $\lambda_{opt}$ each. An ambiguity in elevation can occur here only if the elevational difference between two raster points happens to be larger than one full wave length $\lambda_{opt}$. However, one may make the raster resolution sufficiently fine so that this situation simply does not occur.

FIG. 4 depicts a contour map which was drawn by a plotterfor the three-dimensional model, in an isometric view based on actual data. The ordinate represents optical path differences and the horizontal and the third depth dimension represent the detection plane 42. The intersections of grid lines are the acquired elevational phase data augmented by $\lambda_{opt}$, $2\lambda_{opt}$, etc., as needed. The grid lines are simply added as straight lines and connect phase values of adjacent raster points. The above-mentioned phase angle zero lines would be contour lines resulting from intersection of the contoured surface with horizontal planes traversing the vertical axis at $\lambda_{opt}$, $2\lambda$ etc.

The mode of representing the surface contour of mirror 40 is a matter of convenience. Conceivably, one could move the detector 41 into positions in which the detected phase has particular value and on as fine a scale as such a position control permits. Thus, rather than operating on the basis of a fixed pattern of raster points, one could map the plane 42 in field 45 to detect equal phase points.

It should be realized that the method is not limited to the detection of planarity of mirrors, but one will detect per se the existing contour. This contour may, for example, be a curved one (spherical, parabolic, etc.), and the resulting map simply depicts that contour. If the reference mirror is likewise a curved one, e.g. having "ideal" curvature as to its surface, then the resulting map will again merely represent the deviation of the actual contour of the test mirror from the contour of the reference mirror.

The method and system as described are highly invariant against error sources. Of particular concern here are displacements, even oscillating displacements transversely to the extension of either mirror (piston movement). They will not produce errors because any resulting phase shift affects detectors 41 and 27 equally. Incorrect readings could occur if such oscillations have a frequency comparable to $\Delta f$. However, $\Delta f$ is a free parameter, and it can readily be chosen to be well above any expected mechanical vibration frequency which any part of the equipment involved may undergo.

Conceivably, one may define the reference phase differently. For example, one may use the output of oscillator 12 rather than optically extracting the $\Delta f$ reference signal. Still alternatively, one could optically extract (via a polarization filter) a reference signal of $\Delta f$ frequency directly from beam 106. However, the generation of the reference signal as described earlier is preferred, because any change in position of either mirror 35, 40 along their respective normal direction is directly compensated as it affects the measuring signal and the reference signal equally. One could, however, extract a portion of the beam 110 (via a semitransparent mirror) and summarily detect its brightness, as it oscillates at the $\Delta f$ frequency. One may chose this method, if placement of the reference detector 27 interferes with the raster scan. Any mirror movement will likewise not interfere with the measurement in this case.

It can also be seen that the method is basically invariant to tilting of the mirrors. Tilting introduces a constant sloping in the contour upon which the true contour is superimposed. That tilt could actually be eliminated by computer processing and averaging the elevational values.

If the two mirrors, 35, 40 are at right angles to each other, but the optics in-between is rotated about a vertical axis (as far as the plane of FIG. 1 is concerned), the parallelism of the two components in the output beam 110 will not be disturbed; in other words, the beams combine without having intersecting optical axes.

Figure 1A:
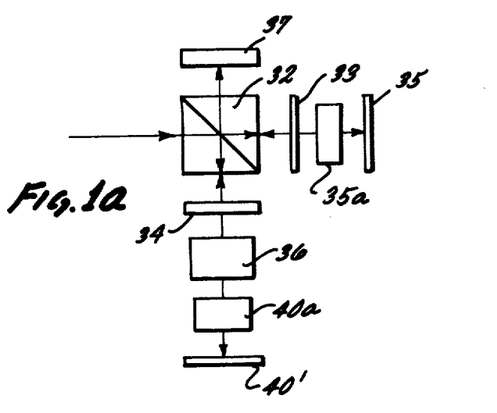
FIG. 1a is a modification of the system of FIG. 1 adapted for resting medium homogeneity.

FIG. 1a illustrates that the inventive interferometeris not limited in its application to detect the contour of mirrors. The test arm in this instance includes a transparent medium 40a whose optical homogeneity is under investigation. Mirror 40' is a highly planar mirror as it is not the subject of the test and its planarity should be comparable to the planarity of mirror 35. Reference numeral 35a refers to a reference object that may be highly homogenic and is included here primarily to offset any amplitude attenuation in the test arm. The detection process will be exactly the same as described and the function $\phi$ being detected represents optical path differences as produced by different local propagation speeds in object 40a on account of any inhomogeneities.

As was mentioned above, the operative auxiliary frequency $\Delta f$ could be chosen between zero and the megacycle range. From the foregoing, it is apparent that $\Delta f=0$ is not really an operative case. However, consider the following. In lieu of the phase scanning as outlined above, one could scan the instantaneous interference pattern, e.g. through TV-type scanning and display or simply by direct visual observation of the pattern generated on a reflective medium or a frosted glass plate or the like, being placed in plane 42. By making the source 12 adjustable, down the zero frequency, one may obtain a still picture at will, i.e. frozen interference pattern. Now one may increase the output signal of 12 to a rather small value to a frequency, say of, one Hz a few Hz or even less than one Hz. This way, one will obtain a rather slow movement of the fringe lines and one may directly observe the contour of the mirror as it is being outlined by the gradually varying contour and shape of the slowly moving fringe lines.

As was outlined earlier, the frequency $f_a$ is, in fact, merely an auxiliary frequency of no immediate significance; it is used because the type of modulation employed (Bragg cells) does not permit direct modulation by means of the frequency $\Delta f$. A lower difference frequency $\Delta f$ is useful for permitting simpler r-f electronics in the circuit 51. However, one may use a different preparatory circuit as shown, for example, in FIG. 3.

Figure 3:
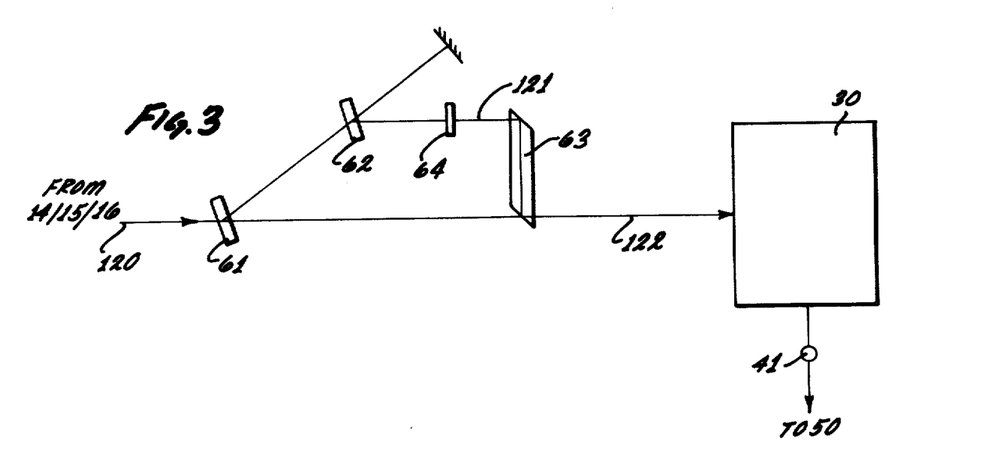
FIG. 3 is a modification of a portion of the system in FIG. 1.

An incoming laser beam 120 of predetermined polarization is split in a first Bragg cell 61 into an unmodified component, having frequency $f_{opt}$ and a frequency shifted component $f_{opt}+f_a$. The latter beam is phase shifted in a second Bragg cell 62 to obtain the frequency $f_{opt}+f_a-(f_a-\Delta f)=f_{opt}+\Delta f$. The latter beam 121 passes the Bragg cell 61 so that any jitter affects both beams. The beam 121 passes through a polarization rotator 64 so that the plane of polarization is rotated by 90°, for example, from the plane of the drawing to a plane transverse to the plane of the drawing.

The beam, next, enters a glass device 63 shaped like a parallelogram and oriented as depicted, so that the beam 121 is totally reflected. The second oblique surface of device 63 functions as beam splitter so that a combined beam 122 leaves the device. This beam will be expanded and further processed by the device 30 explained above.

The invention is not limited to the embodiments described above but all changes and modifications thereof not constituting departures from the spirit and scope of the invention are intended to be included.

We claim:

1. Interferometer for measuring optical path differences representing the surface contour of a test mirror or the homogeneity of a transparent medium, comprising:
   means for producing a beam of monochromatic radiation;
   first means for splitting the beam into two coherent monochromatic components;
   means (a) for frequency shifting one of the two components by a particular value;
   means (b) for frequency shifting one of the two components by a second particular value so that the two components have different frequencies, the frequencies differ by a particular difference frequency;
   means (c) polarizing the two components differently;
   means (d) for recombining the two components to produce a beam having different polarizations and differing slightly in frequency;
   second means disposed for receiving the recombined beam and splitting it into the two components or portions thereof, and having an orientation, to direct one of the split components into a test arm which includes a test object and the other one to a reference arm which includes a reference mirror, the two arms returning the respective components, the means for receiving also recombining the reflected components into a second composite beam;
   filter means disposed in a path of the composite beam for extracting from each component thereof a portion of similar polarization so that these portions as leaving the means for extracting are permitted to and do interfere;
   detector means disposed in a plane perpendicular to an optical path of the interfering beam portion for point by point detecting local brightness variations oscillating at a frequency equal to the difference of the two frequency shifts; and
   means for detecting the relative phase of these oscillations on said point by point basis.

2. Interferometer as in claim 1, said two means for frequency shifting each includes a Bragg cell and means for acoustically stimulating the two Bragg cells at slightly differing frequencies.

3. Interferometer as in claim 1, said means for beam splitting including a polarization type beam splitter and optical means respectively disposed between the splitter and the mirrors for changing linear polarization into circular polarizations and back on return.

4. Interferometer as in claim 1, and including a beam expander disposed between the means for recombining and the second means for splitting.

5. Interferometer as in claim 1, and including a beam expander disposed between the means for splitting and the test object.

6. Interferometer as in claim 1, and including means for extracting from the beam as produced a reference signal oscillating at a frequency equal to the difference in frequencies of said two coherent components and being connected to the phase detection means to supply thereto the reference signal to be used for the phase detecting.

7. Interferometer as in claim 1, said means for detecting including a detector disposed in said plane.

8. Interferometer as in claim 1, said means for detecting including a detector responsive to at least a portion of radiation downstream from said filter means.

9. Interferometer as in claim 1, said means (a) and said means (b) frequency shifting the same component serially and in opposite directions.

10. Interferometer as in claim 1, said means (b) for frequency shifting one of the two components by a second particular value being effective to shift the frequency of the other one of the two components so that the means (a) and the means (b) frequency shift different ones of the two components.

11. Method of interferometrically measuring optical path differences representing the surface contour of a test mirror or the homogeneity of a transparent medium, comprising the steps of:
   producing a monochromatic laser beam; splitting the beam into two components; polarizing the two components differently; frequency shifting one of the components; frequency shifting the same or the other one of the components so that the two components having different frequencies, but the difference being significantly smaller than each of the frequency shiftings; individually recombining the two differently polarized components of different frequencies into a test beam;
   splitting the test beam and directing a first portion of one of the polarizations into an optical test arm which includes a test object such as the medium with a reflector or a test mirror, and directing a second portion of a different polarization into a reference branch which includes a reference mirror;
   recombining the portions as returned by and from the two arms and polarization filtering them to extract portions thereof of similar polarization for purposes of obtaining interference;
   detecting brightness oscillations in discrete points in a plane intercepting the recombined and filtered portions;
   producing electrical signals representative thereof having a frequency equal to said difference; and
   extracting phase information from the electrical signals.

12. Method as in claim 11, wherein the extracting step includes generating a reference signal having said difference frequency and comparing the reference signal with the electrical signals as produced.

13. In an interferometer having a beam splitter for splitting an incoming beam into two components being directed towards different reflecting surfaces and being recombined into a composite beam, the improvement for producing the incoming beam comprising:
   means for providing a monochromatic beam;
   means disposed to receive said beam for splitting the beam into two coherent monochromatic components;
   first and second frequency shifting means;
   means operatively connected to the first and second frequency shifting means to obtain two different frequency shifts;
   said first and second means being disposed for frequency shifting at least one of the components, so that the two components differ in frequency by an amount equal to a difference in said two frequency shifts;

means for polarizing the two beam components differently; and means for recombining the two beams components to produce a single beam having two differently polarized components of differing frequencies.

14. The improvement of claim 13, wherein the first and second means each include a Bragg cell, the operatively connected means provided for modulating the Bragg cells at different frequencies.

15. The improvement of claim 14, said Bragg cells being disposed respectively in the paths for the two beam components as split.

16. The improvement of claim 14, wherein the two cells are serially arranged in the path of one of the beams, to first frequency shift the beam in one direction; and to secondly shift the frequency in the opposite direction to obtain a composite shift, being the difference of the two frequency shifts.

* * * * *